United States Patent [19]

Kemp, Jr. et al.

[11] Patent Number: 4,531,456

[45] Date of Patent: Jul. 30, 1985

[54] LIQUID DISTRIBUTION TROUGH

[75] Inventors: David M. Kemp, Jr., Naperville; Hartl R. Jones, Bensenville, both of Ill.

[73] Assignee: FMC Corporation, Chicago, Ill.

[21] Appl. No.: 654,448

[22] Filed: Sep. 26, 1984

[51] Int. Cl.[3] ..................... A23L 2/40

[52] U.S. Cl. ..................... 99/323.2; 165/60; 165/172; 261/153; 261/DIG. 7

[58] Field of Search ..................... 99/323.2, 323.1, 275, 99/323.3; 261/153, DIG. 7; 165/60, 170, 177, 172, DIG. 1

[56] References Cited

U.S. PATENT DOCUMENTS

| | | | |
|---|---|---|---|
| 3,926,342 | 12/1975 | Barden | 261/153 |
| 4,112,828 | 9/1972 | Mojonnier | 261/DIG. 7 |
| 4,259,360 | 3/1981 | Venetucci | 99/323.2 |
| 4,416,194 | 11/1983 | Kemp | 99/323.2 |
| 4,434,112 | 2/1984 | Pollock | 261/153 |
| 4,477,396 | 10/1984 | Wilkinson | 261/153 |

*Primary Examiner*—Robert W. Jenkins

*Attorney, Agent, or Firm*—L. J. Pizzanelli; Richard B. Megley

[57] ABSTRACT

A constant level of liquid carbonation is achieved irrespective of the rate at which liquid is supplied to a carbonating vessel by, respectively, establishing a thin film of liquid over refrigerated heat transfer surfaces, which may take the form of plates, and controlling, in response to the flow-rate of the liquid, the area of the heat transfer surface covered by the liquid film.

12 Claims, 5 Drawing Figures

FIG_2
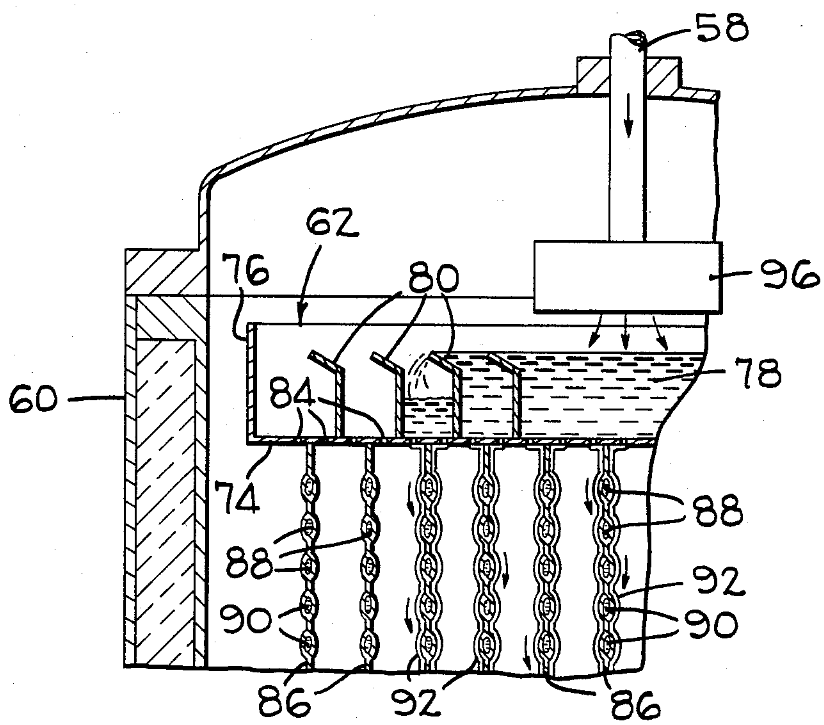
FIG_3
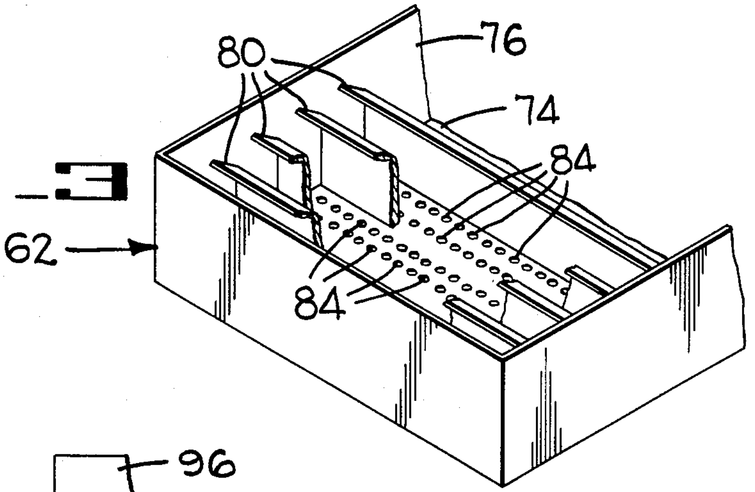
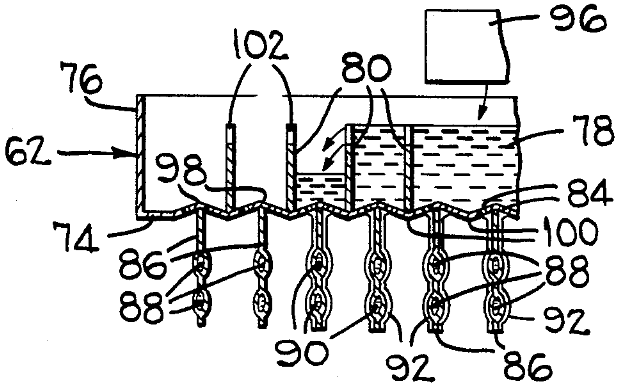
FIG_4
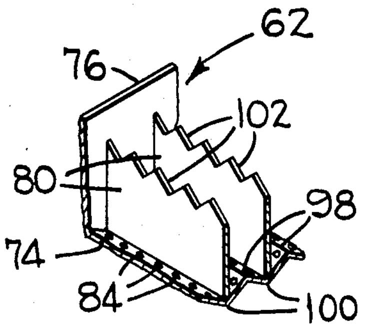
FIG_5

LIQUID DISTRIBUTION TROUGH

This invention relates to a system for preparing a beverage and more particularly to a system for uniformly carbonating a beverage.

Variable flow liquid proportioners, an example of which is the subject matter of a hereinafter identified U.S. application, requires, for proper carbonation and efficient operation of the refrigeration system, even distribution of proportioned liquid over heat transfer surfaces. More particularly efficient operation in a system incorporating a variable flow proportioner would fulfill the objective of establishing, over heat transfer plate, a fixed flow rate and insure that each plate would be covered with a thin film of liquid. Achieving this objective permits operating the carbonation tank at a constant pressure and maintaining the refrigeration system at a constant temperature.

According to the present invention proportioned liquid is discharged into a closed vessel which is provided with an atmosphere of carbon dioxide gas at a selected pressure. A trough located in the upper portion of the vessel and having its bottom wall perforated momentarily contains the proportioned liquid which flows through the perforation and along, in the form of a thin film, a plurality of vertically extending laterally spaced plates provided with passage ways through which refrigerant flows. In its excursion along the surface of the plates, the liquid absorbs carbon dioxide and is collected in the bottom of the vessel from which it is pumped or displaced to a filling apparatus.

In accordance with the principal feature of this invention means are provided for distributing the proportioned liquid in the receiving trough so that the number of refrigerated plates provided with a film of liquid is proportional to the rate at which proportioned liquid is supplied to the trough.

BRIEF DESCRIPTION OF THE DRAWINGS

FIG. 2 is an enlarged fragmentary section along the line 2—2 of FIG. 1 of a carbonating tank or vessel in which the liquid distribution trough of the present invention is incorporated;

FIG. 3 is a fragmentary perspective illustrating certain details of construction of a liquid distributing trough;

FIG. 4 is an elevation of a modified form of a liquid distributing trough; and

FIG. 5 is a fragmentary portion of FIG. 4 showing details of construction of a modified trough.

DESCRIPTION OF THE PREFERRED EMBODIMENT

Figure 1:
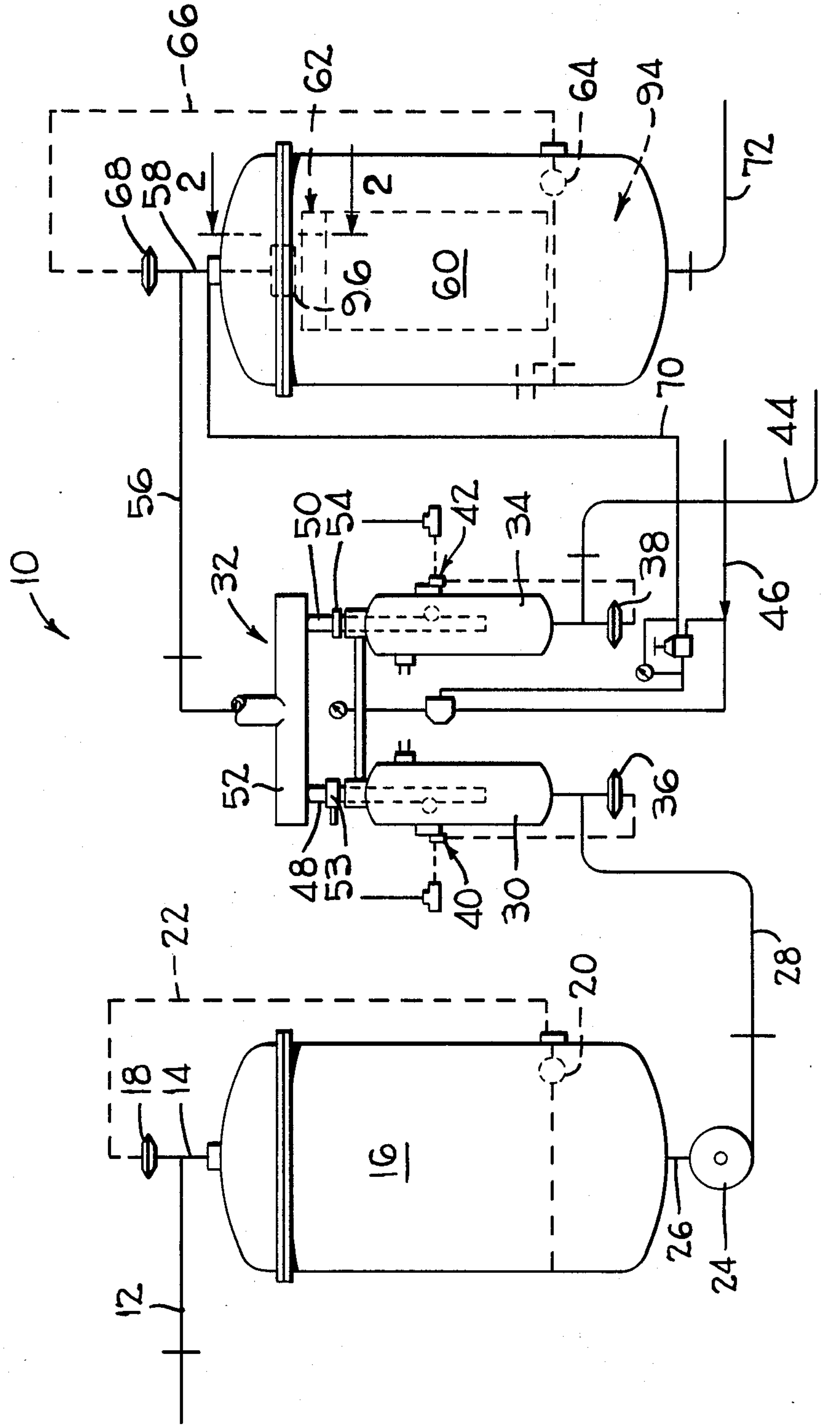
FIG. 1 is a schemmatic of a mix processing system incorporating the novel trough distribution apparatus of the present invention.

The mixed processing system incorporating the subject matter of the present invention shown in FIG. 1 as generally identified by numeral 10. Except as pointed out hereinafter the system is substantially similar to the system described in co-pending application Ser. No. 588,427 filed Mar. 12, 1984 to D. Kemp, Jr. et al which is assigned to the assignee of the present invention. The processing system of FIG. 1 will be described in suffirecient detail to disclose the treatment of the liquid introduced in a carbonator-cooler vessel which contains the novel distributing trough of the present invention.

Water from a suitable supply is discharged, by lines 12 and 14, to a precooler and/or deaerating vessel 16 which is provided with conventional controls 18 and 20, interconnected by a control line 22, for maintaining the level of liquid in the vessel 16 within a predetermined range. A pump 24, through lines 26 and 28, transfers water from the vessel 16 to a chamber 30 being part of a proportioning apparatus 32 which includes an additional similar chamber 34. The chamber 30, as well as the chamber 34, are provided with liquid level controls comprising diaphragm valves 36 and 38 and liquid level detectors 40 and 42.

A beverage concentrate or syrup is supplied to the chamber 34 by line 44. Each of the chambers 30 and 34 are connected by line 46 to a supply of inert gas, such as carbon dioxide, under pressure, establishing, above the level of water in chamber 30 and above the level of the syrup in chamber 34 a head space of pressure fluid which is utilized to displace the water and syrup through immersed conduits 48 and 50, to a mixing chamber 52 combining the two liquids in a predetermined ratio achieved by orifices 53 and 54 in conduits 48 and 50, respectively. The proportioned fluid or liquid is introduced, by lines 56 and 58, into a carbonator-cooler vessel 60 containing the liquid distribution trough 62 which is the subject matter of the present invention. The vessel 60 is provided with a liquid level detector 64 operatively connected, by a pilot pressure line 66, to a diaphragm valve 68 controlling the flow of proportioned liquid in line 56 to the vessel 60. The pressure of carbon dioxide in the carbonating vessel 60 is sensed by line 70 and the level of pressure sensed serves to automatically control upstream pressure in the chambers 30 and 34. Cooled and carbonated liquid is collected in the base of the vessel 60 and is supplied to a filling machine (not shown) by a line 72.

In accordance with the invention, the liquid distributing trough is formed with at least two chambers or wells which will retain a body of liquid for distribution in a controlled manner over the surface of depending plates having a serpentine channel through which refrigerant flows. More particularly, controlled flow of liquid over the refrigerated plate takes the form of a thin film which not only enhances cooling but exposes and allows the proportioned liquid to absorb a greater quantity of carbon dioxide.

With reference to FIG. 2 it will be seen that the trough 62 is formed with a bottom wall 74 and upstanding side walls 76 extending entirely around the bottom wall 74 so that proportioned liquid admitted to the vessel 60 by the line 58 accumulates and defines a pool of liquid 78. While not illustrated, it is to be understood that the preferred form of the trough of the present invention takes the form, in plan, of a rectangle with approximately a central one-third of its area being unobstructed and one-third of its area, at either end of the trough, is provided with a plurality of partitions or weir plates 80 defining separate chambers or compartments of liquid accumulating cells that successively accumulate a pool of liquid depending on the rate at which proportioned liquid is supplied by the line 58. The bottom wall 74 of the trough 62 is formed with a plurality of aperatures or perforations 84 which extend along a line parallel to the weirs 80 and a plurality of such lines of perforation are associated with generally planar refrigerated plates 86 each of which is provided with a serpentine channel or passage way 88 through which refrigerant 90 flows.

As shown in FIG. 2 the plates 86 have their upper marginal edges in abutting contact with the bottom wall 74 and are positioned between rows of perforations 84 so that the liquid, flowing by gravity through the perforations encounter the surfaces of the plates 86 and produce a thin film 92 as the liquid flows downwardly in the vessel 60 to provide a reservoir 94 with cooled and carbonated proportioned liquid.

A liquid diffusing nozzle structure 96 is connected to the line 58 and overlies the central portion of the trough 62 and it serves to minimize turbulance and splashing of the liquid as it enters and fills the underlying portion of the trough. In those circumstances where the rate of liquid input through the line 58 is equal or substantially equal to the rate at which liquid flows through the perforations 84 to the plates 86 underlying the central portion of the trough, the plates 86 underlying the chambers or liquid accumulating cells defined by the weirs 80 are not coated with a film of liquid since no liquid spills over the weirs 80 from the principal pool of liquid 78. While the input flow rate through line 58 substantially equal to the outflow from the principal pool 78 through the perforations 84 only those refrigerated plates 86 underlying the pool are operative to extract heat from the liquid film flowing thereover while the plates 86 underlying the successive lateral chamber defined by the weirs 80 are not coated with liquid and therefore heating of the refrigerant 90 does not occur.

When the volume of liquid introduced by the line 58 is greater than volume discharged through the perforations 84 from the pool 78, the proportioned liquid will flow over one or more successive weirs 80 sequentially filling the chambers or liquid accumulating cells defined by the weirs 80. Accordingly, and in response to the volumetric flow introduced by the line 58, the number of plates 86 being operative to extract heat from the liquid film coating the plates depends upon the number of cells defined by the weirs 80 that are filled with liquid which is available to pass through the aperatures 84 onto the plates 86.

The modified form shown in FIGS. 4 and 5 principally concerns the surface configuration of the wall 74 and the form of the weir plates whereby the upper edges are of a saw tooth configuration. With reference to FIG. 4 it will be observed that the bottom wall 74 of the distributing trough 62 is formed as a corrugated structure having peaks and valleys 98 and 100, respectively. As best illustrated in FIG. 5, the perforations or aperatures 84 are located in the inclined walls extending from the peak 98 to the valley 100 and that the upper edges of the plates 86 are located in the depression of the peak 98 while the weirs 80, interiorly of the trough 62, are fixed to the depression defined by the valley 100. In this manner liquid discharged through the passageways or perforations 84 inpinge the plates 86 promptly on being discharged.

As mentioned above the weirs 80 have their upper edges formed in a saw tooth configuration 102. This relationship allows liquid to migrate from the central pool 78 to successive outward compartment of cells in a more uniform manner since a smoother and more progressive flow rate from one cell to the other can be achieved by the saw tooth configuration.

Thus, in accordance with the present invention, the utilization of weirs in a distribution trough allows flow rates exceeding a minimum quantity to overflow the weirs thus allowing additional plates of the refrigerating unit to be utilized in response to changes in flow rate and the reservoir or trough area may be designed to process liquids up to a given maximum flow rate.

Although the best mode contemplated for carrying out the present invention has been herein shown and described it will be apparent that modification and variations may be made without departing from what is regarded to be the subject matter of the present invention.

What is claimed is:

1. In a cooling and carbonating vessel having disposed therein a liquid distributing trough momentarily retaining liquid supplied to the vessel and a plurality of cooling surfaces adjacent to and extending downwardly from the trough, the vessel also being supplied with carbon dioxide at a selected pressure; the improvement in said liquid distributing trough comprising means for establishing at least two liquid retaining chambers; one of said chambers receives liquid directly from a conduit supplying liquid to the vessel and the other receiving excess liquid from said one chamber; means in each of said chambers for allowing liquid to gravitationally flow over the cooling surfaces and in the course thereof absorb carbon dioxide; and means in said vessel for collecting the cooled and carbonated liquid.

2. The cooling and carbonating vessel according to claim 1 wherein said means for allowing gravitational flow of liquid from the chambers comprise aperatures formed in a linear row and said means establishing the chambers comprise partitions over which liquid flows from one compartment to the other, said row of aperatures are parallel to the partitions.

3. The cooling and carbonating vessel according to claim 2 wherein said partitions have their upper edges formed with a saw tooth configuration.

4. The cooling and carbonating vessel according to claim 2 wherein said partitions have their upper bent in a direction inclined from said one chamber.

5. The cooling and carbonating vessel of claim 1 wherein said liquid distributing trough comprises a rectangle base plate having a plurality of linear rows of aperatures formed therein, an upstanding peripheral wall integral with said base plate, and a plurality of upstanding partitions integral with the base plate and extending between opposed reaches of said peripheral walls, said partitions dividing the trough such that approximately the central one-third of its area is free of partitions and the end portions, constituting the remaining area are each provided with a plurality of partitions, the aperatures in the end portions are spaced from and substantially parallel to the portions.

6. The cooling and carbonating vessel of claim 5 wherein the upper edges of the partitions are lower than the upper edge of the peripheral wall.

7. The cooling and carbonating vessel of claim 1 wherein at least one cooling plate is associated with and receives flow of liquid from the trough.

8. A carbonating apparatus including a liquid treatment vessel being supplied with liquid at a variable flow rate and maintaining an atmosphere therein of carbon dioxide at a selected pressure; said vessel comprising means for collecting liquid supplied thereto; said collecting means being formed to define at least two communicating chambers; means in each of said chambers for allowing liquid to gravitationally flow therefrom to cooling means; said liquid in passing over the cooling means establishes a liquid layer thereover and continues to flow by gravity to a reservoir in said vessel; and means for dividing said collecting means into said chambers one of which is supplied with liquid overflowing from the other chamber.

9. A cooling and carbonating apparatus including an enclosed vessel supplied with liquid at a variable flow rate and with carbon dioxide at a selected pressure; means for collecting the liquid introduced from the liquid supply; said collecting means being formed to define a plurality of liquid containing chambers; perforations in bottom wall of said collecting means permitting gravitational flow of liquid therefrom; a plurality of plates adjacent to the bottom wall of said collecting means and provided with passageways connected to a source of refrigerant; said liquid flowing from said collecting means flows over and covers said plates with a thin layer of liquid which is cooled and carbonated before being collected in the base of the vessel; one of said chambers receiving liquid directly from the liquid supply and the others receiving excess liquid from said one chamber; said collecting means being operative depending on rate at which liquid is supplied to said one chamber to discharge liquid to the other of said plurality of chambers and accordingly cause flow of liquid therefrom to and over the plates associated with said other chambers.

10. The cooling and carbonating apparatus according to claim 9 wherein the bottom wall of said collecting means is corrugated.

11. In a carbonating apparatus having a trough for containing and discharging, through perforations in its bottom wall, liquid supplied thereto over depending heat transfer plates, the trough and the plates being contained in an enclosed vessel connected to a source of carbon dioxide and the supply of liquid; the improvement in said trough comprising means for dividing said trough into at least two compartments one of which collects the liquid supplied to the vessel; the other of said two compartments receiving excess liquid from said one compartment for discharge through perforation associated with said other compartment to the surface of a heat transfer plate depending therefrom.

12. A carbonating apparatus including a liquid treatment vessel being supplied with liquid at a variable flow rate and maintaining an atmosphere therein of carbon dioxide at a selected pressure; said vessel comprising means for collecting liquid supplied thereto; said collecting means provided with means to define at least two communicating chambers; and means in each of said chambers for allowing liquid to gravitationally flow therefrom to cooling means; said liquid in passing over said cooling means establishes a liquid layer thereover and continues to flow by gravity to a reservoir in said vessel; said means for defining said at least two chambers permits liquid in excess of an amount that can be contained by one of said chambers to flow to the other chamber.

* * * * *